United States Patent [19]

Herzke

[11] Patent Number: 4,911,286

[45] Date of Patent: Mar. 27, 1990

[54] STEEPLY INCLINED CONVEYOR WITH SLIPPAGE STOPS ON THE CONVEYOR SURFACE

[75] Inventor: Harry Herzke, Hanover, Fed. Rep. of Germany

[73] Assignee: Firma Ernst Siegling, Hanover, Fed. Rep. of Germany

[21] Appl. No.: 336,330

[22] Filed: Apr. 11, 1989

[30] Foreign Application Priority Data

Apr. 21, 1988 [DE] Fed. Rep. of Germany ....... 3813331

[51] Int. Cl.⁴ .............................................. B65G 15/42
[52] U.S. Cl. .................................. 198/690.2; 198/692; 198/697; 198/803.14
[58] Field of Search ................... 198/688.1, 690.2, 692, 198/693, 697, 699, 699.1, 803.14

[56] References Cited

U.S. PATENT DOCUMENTS

| 1,146,866 | 7/1915 | Graper | 198/699.1 |
| 3,904,021 | 9/1975 | Schweitzer | 198/803.14 |
| 3,939,965 | 2/1976 | Blattermann et al. | 198/688.1 |
| 4,538,949 | 9/1985 | Liet et al. | 198/692 |

FOREIGN PATENT DOCUMENTS 670461 11/1929 France ............................... 198/699.1

Primary Examiner—Joseph E. Valenza
Attorney, Agent, or Firm—Penrose Lucas Albright; Robert A. Miller

[57] ABSTRACT

A steeply inclined conveyor comprising an endless elastic conveyor belt extending around guide rollers to define a conveying portion and a returning portion, and support rollers for supporting the returning portion of the belt, is provided with longitudinally spaced stops on the belt for preventing slippage of material carried by the conveying portion, each stop being mounted on a tongue formed in the belt and having two longitudinal side edges, a trailing transverse edge with respect to the direction of travel of the belt, and a leading edge transition portion parallel to the trailing transverse edge and merging flush into the belt, the tongues having the same thickness as the belt, and the stops being disposed at the trailing edges of the tongues.

3 Claims, 2 Drawing Sheets

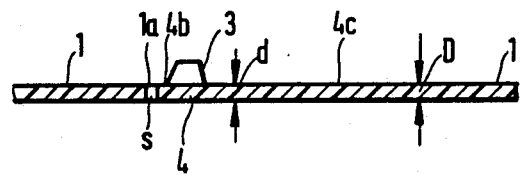
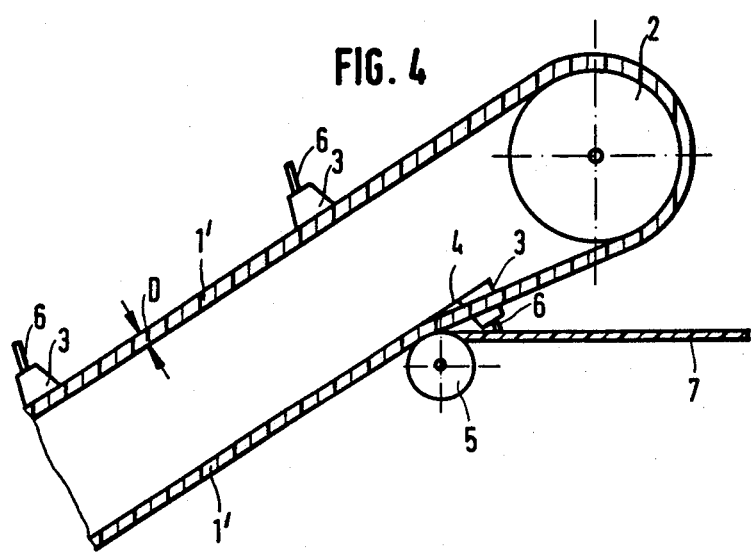

STEEPLY INCLINED CONVEYOR WITH SLIPPAGE STOPS ON THE CONVEYOR SURFACE

BACKGROUND OF THE INVENTION

1. Field of the Invention

The invention relates to a steeply inclined conveyor comprising an endless elastic conveyor belt having a conveyor surface, guide rollers around which the conveyor belt passes to define a conveying portion and a returning portion of the belt, spaced support rollers for supporting the returning portion of the conveyor belt, and a plurality of stops spaced longitudinally apart on the conveyor surface for engaging material carried by the conveying portion of the belt to halt slippage of the material on the belt in a direction opposite to the conveying direction.

2. Summary of the Prior Art

An arrangement of this type is known having tongue-shaped stops which form an included an angle with the conveying surface of the conveyor belt, the free transversal edge of each stop facing forward in front of the fixing point thereof with respect to the direction of conveying. If the load carried by the conveyor belt begins to slip against the conveying direction, it strikes against the free transversal edge of the tongue and pivots the latter in such a manner that the angle between the conveying surface on the one hand and the tongue on the other hand is increased. By this means the striking area of the tongue-shaped stop is increased and further-slipping movement of the conveyed material towards the lowest point of the inclined conveyor is prevented.

It is a drawback of this arrangement, however, that the free leading edges of the outwardly-protruding tongue-shaped stops situated in the returning portion of the conveyor belt run up against the support rollers with the result that, in time, the stops tend to tear at their fixing point in the conveyor belt, thereby adversely affecting their operation.

SUMMARY OF THE INVENTION

It is an object of the invention to provide a steeply inclined conveyor with slippage stops such that their fixing points, i.e. the transition points with the conveyor belt, do not become overloaded during the running up of the stops against the support rollers for the returning portion of the belt, so that the formation of tears at these critical points may be avoided.

To this end, according to the invention there is provided a steeply inclined conveyor comprising an endless elastic conveyor belt, said belt having a conveyor surface, guide rollers around which said conveyor belt passes to define a conveying portion and a returning portion of said belt, spaced support rollers for supporting said returning portion of said conveyor belt, a plurality of tongues formed in said conveyor belt at longitudinally spaced intervals in the direction of travel of said belt, each of said tongues having two longitudinal side edges, a trailing transverse edge with respect to the direction of travel of said conveyor belt, and a leading edge transition portion disposed substantially parallel to said trailing transverse edge and merging flush into said belt, said tongues having a thickness which is the same as the thickness of said conveyor belt, and a plurality of stops spaced longitudinally apart on said conveyor surface for engaging material carried by said conveying portion of said conveyor belt to prevent or halt slippage of said material on said conveying portion in a direction opposite to the conveying direction, said stops being disposed on said tongues in the region of said trailing transverse edges thereof.

With this arrangement each stop itself runs up against the support rollers with the result that it, together with the tongue carrying it, pivots into the space situated between the conveying portion and the returning portion of the conveyor belt, and thereby excessive stresses at the critical points are avoided. When each stop has moved over a support roller it pivots, as a consequence of the elasticity of the tongue, back to its starting position in which the tongue and the conveyor belt surrounding it lie completely flush with each other.

Preferably a gap is provided between the edges of each tongue and the adjacent edges of the conveyor belt surrounding it.

In a particularly preferred form of the invention a guiding device is provided in front of each support roller with respect to the direction of movement of the returning portion of said conveyor belt, said guiding device defining an acute angle with the returning portion of said belt, and at least one outwardly protruding pin is mounted on each stop for engaging said guiding device to deflect said stop inwards with respect to said endless conveyor belt as said returning portion thereof moves over said guiding device.

Steeply inclined conveyors in accordance with the invention are particularly suitable for the conveying of fibrous material, e.g., tobacco, cotton, fiber fleeces and the like.

Two embodiments of the steeply inclined conveyor in accordance with the invention will now be described, by way of example, with reference to the accompanying diagrammatic drawings.

BRIEF DESCRIPTION OF THE DRAWINGS

FIG. 3 is a longitudinal section along line III—III in FIG. 2; and

FIG. 4 is a view similar to that of FIG. 1 but showing a second embodiment of the steeply inclined conveyor in accordance with the invention.

DESCRIPTION OF THE PREFERRED EMBODIMENTS

Figure 1:
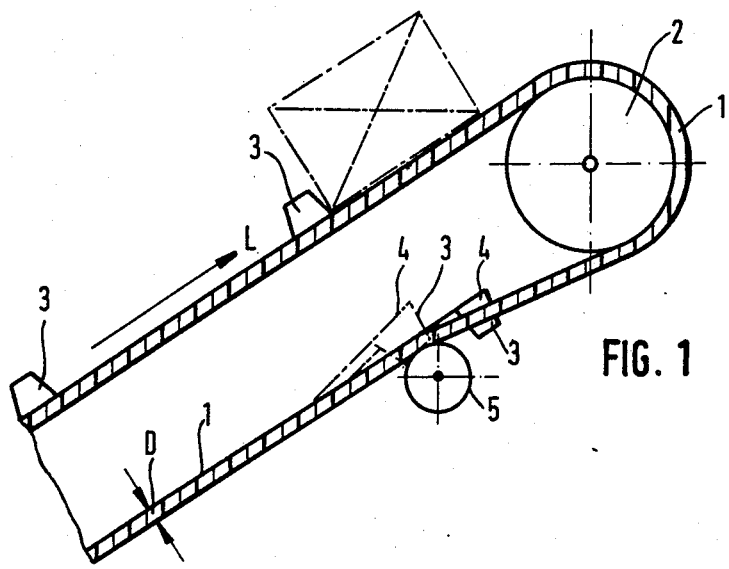
FIG. 1 shows a side view of the upper end portion of a first embodiment of the steeply inclined conveyor in accordance with the invention.
Figure 2:
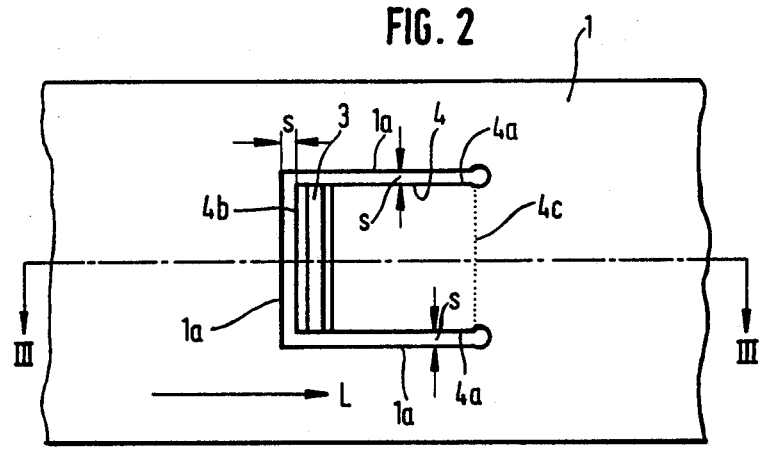
FIG. 2 shows a partial top plan view of the embodiment shown in FIG. 1.

The conveyor illustrated in FIGS. 1 to 3 comprises an endless elastic conveyor belt 1 which passes around guide rollers 2 so that the conveying surface of the belt faces outwards. For reasons of clarity, only one guide roller 2 has been represented, and this is appropriately drivable. The direction of movement of the conveyor belt 1 is denoted by arrow L.

Reference numeral 3 denotes stops which are spaced from each other in the longitudinal direction of the conveyor belt 1. These stops 3, in the embodiment shown, have a trapezoidal shape in cross-section, but may be of any other shape as desired. It lies within the scope of the invention also to provide several spaced stops 3 in the transverse direction of the conveyor belt 1. In this respect the concept of the invention is not restricted in any way.

Each stop 3 is mounted on a tongue 4 having two longitudinal sides 4a and a free transverse edge 4b at the trailing end of the tongue with respect to the direction of movement L of the belt 1. As FIGS. 2 and 3 clearly show, the tongue 4 joins flush into the conveyor belt 1 at its leading edge 4c (transition point) disposed parallel to the trailing transverse edge 4b, so that there are no points of impact of any kind on the tongue. The step 3 is situated in the region of the trailing transverse edge 4b of the tongue 4 and is thus behind the transition edge 4c with respect to the direction of travel L.

A gap is provided between the edges 4a and 4b of the tongue 4 and the facing edges 1a of the conveyor belt 1 around the tongue, so that frictionless pivoting of the tongue 4 is possible.

The thickness d of the tongue 4 is the same as the thickness D of the conveyor belt 1, as shown in FIG. 3.

As will be seen in FIG. 1 the returning portion of the conveyor belt rests on a guide in the form of a succession of spaced support rollers in the direction of movement, although for reasons of clarity only one support roller 5 has been shown.

The conveyor shown in FIGS. 1 to 3 operates as follows.

Let it be assumed, for example, that individual cuboid items of material being carried by the conveyor have reached the highest point of the conveyor belt and start to slip backwards because of insufficient friction. This slipping movement is accordingly halted when the conveyed material comes into engagement with a stop 3.

In the return run of the conveyor belt the stop 3 strikes the support roller 5 and, upon further movement of the returning portion of the belt 1, swivels into the space between the upper (conveying) and lower (returning) portions of the belt as shown in FIG. 1 by means of a chain-dotted line. The striking side of the stop 3 is appropriately designed so that the pulse created on impact with the rollers is reduced to a minimum. Still further movement of the returning portion of the conveyor belt 1 carries the stop past the roller 5, whereupon the stop is released so that the elasticity of the tongue 4 is able to move the tongue back into its starting position in which it lies completely flush with the conveyor belt 1.

FIG. 4 of the drawings shows a modified form of the conveyor in which each stop 3 is provided with at least one outwardly protruding spike or pin 6 or the like, which may be bent at one end in the manner of a hook. In addition, in front of each support roller 5 as seen in the direction of movement of the returning portion of the conveyor belt 1, there is provided a guiding device 7, e.g. in the form of a guide plate, which forms an acute angle with the returning portion of the belt 1.

As each stop 3 approaches the guiding device 7, the corresponding pin 6 engages the guiding device 7, and the stop 3 and therewith the tongue 4 are gradually deflected into the space between the conveying and returning portion of the conveyor belt 1 as the belt carries them towards the roller 5. After being carried past the roller, the tongue 4 with the stop 3 pivots back again into the starting position as in the case of the embodiment shown in FIGS. 1 to 3.

The embodiment shown in FIG. 4 is particularly suitable for the transport of fibrous material, e.g. tobacco, cotton, fiber fleece or felt, and the like.

A particular advantage of the invention is the possibility of forming the tongues 4 by punching or the like as a subsequent operation into conveyor belts which travel in even, level manner. If the tongues 4 are then further provided with the stops 3, the conversion of standard conveyor belts is thus possible without extensive expenditure of time and materials.

I claim:

1. A steeply inclined conveyor comprising:
   an endless elastic conveyor belt, said belt having a conveyor surface,
   guide rollers around which said conveyor belt passes to define a conveying portion and a returning portion of said belt,
   spaced support rollers for supporting said returning portion of said conveyor belt,
   a plurality of tongues formed in said conveyor belt at longitudinally spaced intervals in the direction of travel of said belt, each of said tongues having:
   two longitudinal side edges,
   a trailing transverse edge with respect to the direction of travel of said conveyor belt, and
   a leading edge transition portion disposed substantially parallel to said trailing transverse edge and merging flush into said belt,
   said tongues having a thickness which is the same as the thickness of said conveyor belt, and
   a plurality of stops spaced longitudinally apart on said conveyor surface for engaging material carried by said conveying portion of said conveyor belt to prevent or halt slippage of said material on said conveying portion in a direction opposite to the conveying direction,
   said stops being disposed on said tongues in the region of said trailing transverse edges thereof.

2. A conveyor according to claim 1, wherein said longitudinal side edges and said trailing transverse edge of each of said tongues are spaced from the surrounding portions of said conveyor belt to provide a gap therebetween.

3. A conveyor according to claim 1, wherein a guiding device is provided in front of each support roller with respect to the direction of movement of the returning portion of said conveyor belt, said guiding device defining an acute angle with the returning portion of said belt, and at least one outwardly protruding pin is mounted on each stop for engaging said guiding device to deflect said stop inwards with respect to said endless conveyor belt as said returning portion thereof moves over said guiding device.

* * * * *